United States Patent [19]

Gagliani et al.

[11] E Re. 30,213

[45] Reissued Feb. 12, 1980

[54] METHOD OF MAKING FOAMED COPOLYIMIDES AND PRODUCT OBTAINED THEREFROM

[75] Inventors: John Gagliani, San Diego; John V. Long, El Cajon, both of Calif.

[73] Assignee: International Harvester Company, Chicago, Ill.

[21] Appl. No.: 25,004

[22] Filed: Mar. 29, 1979

Related U.S. Patent Documents

Reissue of:

[64] Patent No.: 3,966,652
Issued: Jun. 29, 1976
Appl. No.: 522,765
Filed: Nov. 11, 1974

[51] Int. Cl.[2] ..... C08J 9/02

[52] U.S. Cl. ..... 521/185; 260/33.4 R; 528/128; 528/188; 528/229; 528/352; 528/353

[58] Field of Search ..... 521/185, 128, 188

[56] References Cited

U.S. PATENT DOCUMENTS

| | | | |
|---|---|---|---|
| 3,483,144 | 12/1969 | Lavin et al. | 260/2.5 N |
| 3,705,118 | 12/1972 | Abolafia | 260/2.5 N |
| 3,726,834 | 4/1973 | Acle, Jr. | 260/2.5 N |
| 3,793,281 | 2/1974 | Acle, Jr. | 260/2.5 N |

*Primary Examiner*—Morton Foelak
*Attorney, Agent, or Firm*—LeBlanc, Nolan, Shur & Nies

[57] ABSTRACT

Copolyimide foams made from lower alkyl esters of tetracarboxylic acids and two or more diamines. Precursors for such copolyimides. Processes for making the precursors and for converting them to copolyimide foams.

7 Claims, No Drawings

METHOD OF MAKING FOAMED COPOLYIMIDES AND PRODUCT OBTAINED THEREFROM

Matter enclosed in heavy brackets [ ] appears in the original patent but forms no part of this reissue specification; matter printed in italics indicates the additions made by reissue.

This invention relates to copolyimides and, more specifically, to novel, improved copolyimide foams which, in addition to their other attributes, are structurally stable and remain flexible and resilient over a wider temperature range than those heretofore available. In other aspects our invention relates to novel precursors for such copolyimide foams and to novel methods for making and foaming the precursors.

U.S. Pat. Nos. 3,726,834 and 3,793,281 issued Apr. 10, 1973, and Feb. 19, 1974, to Acle; 3,554,935 issued Jan. 12, 1971, to Knapp et al; and 3,544,939 issued the same day to Lavin et al disclose copolyimide foams made from tetracarboxylic acid derivatives and various diamines. One disadvantage of the polyimides disclosed in these patents is that they become brittle and structurally unstable at cryogenic temperatures (−300° F. or lower). If struck or otherwise subjected to mechanical stress at such temperatures, the cellular structure of these foams collapses; and they may even crumble into a powder.

We have unexpectedly discovered that this disadvantage of the patented polymers can be overcome and foams which are structurally stable at elevated temperatures but remain flexible and resilient at cryogenic temperatures obtained by substituting a novel mixture of diamines which produces longitudinal disorder in the polymer chain for the diamines suggested by the listed patents. This also permits foaming to be carried out at lower temperatures than has ordinarily been possible heretofore which is important for obvious reasons.

Their unique properties make the novel copolyimide foams we have invented useful in a variety of applications involving a wide range of temperatures. They may, for example, be used to particular advantage as heat shields in temperatures as high as 600+° F. and as gaskets in apparatus operating at or subjected to cryogenic temperatures.

Another attribute of our novel foams, which is important in a variety of applications, is that they give off essentially no smoke when heated to degradation temperatures. On the order of ten percent of the degradation products of typical prior art polyimides, in contrast, come off as smoke.

The initial step in making our novel cryogenic foams involves the preparation of a resinoid or solid state solution type of precursor. This precursor preferably contains essentially equimolar proportions of one or more, chemically pure, lower alkyl diesters of a tetracarboxylic acid and a mixture of two or more diamines. At least one of the diamines must be a heterocylic diamine, and any diamine which is not heterocyclic is preferably an aromatic meta or para-substituted diamine which contains no aliphatic moieties.

If diamines which do have aliphatic moieties are used, the resulting foam will be significantly less structurally stable. Also, smoke will be produced if the foam is heated above its thermal degradation temperature. Thus diamine mixtures such as those disclosed in U.S. Pat. No. 3,424,718 issued Jan. 28, 1969, to Angelo would be decidedly inferior for our purposes to the diamine mixtures we preferably employ.

Mixtures of diamines must be employed so that there will be a random distribution of dissimilar, recurring, aromatic and heterocyclic units in the polymer chain. As will be shown hereinafter, the advantages of our novel foams are not possessed when one or a mixture of aromatic diamines is employed; and precursors like ours but containing only a heterocyclic diamine cannot be foamed at all.

Examples of suitable aromatic diamines are 3,3'-diamino diphenyl sulfone; 4,4'-diamino diphenyl sulfone; 4,4'-diamino diphenyl sulfide; 3,3'-diamino diphenyl ether; 4,4'-diamino diphenyl ether; benzidine, meta-phenylene diamine; and para-phenylene diamine.

The heterocyclic diamines we can employ include 2,6-diamino pyridine and 3,5-diamino pyridine.

We can use from 95 parts by weight of heterocylic diamine to 5 parts of aromatic diamine to 95 parts of aromatic diamine to 5 parts of heterocyclic diamine.

The above-cited Acle patents do of course indicate that heterocyclic diamines may be used in the polyimides therein disclosed. However, Acle does not attribute any special significance to the use of such diamines, let alone recognize that the presence of a heterocyclic diamine and the combination therewith of an aromatic diamine are prerequisites for resiliency, flexibility and structural stability at cryogenic temperatures.

Another U.S. Pat. which discloses polyimides made from heterocyclic diamines is U.S. Pat. No. 3,661,849 issued May 9, 1972, to Culbertson. However, there is no suggestion in this patent that the polymers therein disclosed can be obtained in foamed form, that a mixture of diamines can be used, or that the polymers are usable at cryogenic temperatures. Furthermore, Culbertson's diamines are quite different from those we use.

The ester component of the precursor is prepared by reacting the tetracarboxylic acid or its anhydride with one or more aliphatic alcohols at up to reflux temperature to esterify it.

The acidic constituent we preferably employ is 3,3'4,4'-benzophenonetetracarboxylic acid dianhydride. The esters can be made from the acid instead of the dianhydride, if desired. However, as the anhydride is the commercially available and most stable form, it will typically be employed.

The alcohols we use are those containing from 1 to 3 carbon atoms. Ethyl alcohol free of denaturants and additives is in many cases preferred.

Mixtures of $C_1$–$C_3$ esters can also be employed to advantage. These afford additional control over the foaming of the precursor as volatiles come off at different temperatures if mixed esters are used.

The mixture present after esterification is complete will typically be cooled before the diamines are added strictly as a safety measure. The diamines are then added and the mixture stirred, typically at reflux, until the diamines are dissolved.

Excess alcohol is removed from the resulting product at reduced pressure until it becomes a thick syrup.

Removal of the solvent is then interrupted, and a surfactant is preferably added to control the pore size and the cellular structure of the foam which will ultimately be made. We employ from 0.1 to 10 parts by weight of surfactant for each 100 parts of resin constituent for this purpose.

One suitable surfactant is Union Carbide L-5430 silicone surfactant. That company's L-5410 and L-530 surfactants are also suitable as are various silicone surfactants available from Dow Chemical and General Electric.

The surfactant is stirred into the syrupy mixture at a temperature of from 77° to 131° F. Excess solvent is then removed by heating the mixture at 150° to 160° F. under reduced pressure for 6–8 hours.

At the end of this cycle the product is a fragile resinoid which is pulverized into a powder with a maximum particle size of 40 mesh.

This powered resinoid is further processed to reduce its volatile content to a value which is one to five percent lower than the theoretical volatiles content of the resinoid (The theoretical volatiles content is the weight percent of alcohol and water in the benzophenonetetracarboxylic ester and diamine molecules released during the condensation polymerization reactions. It is these volatiles that foam the resinoid during the foaming process). The volatiles content of the resin is lowered below the theoretical value to avoid the presence of free solvent as this would interfere with the foaming process. If the volatiles content is not reduced prior to foaming, volatilization will occur too fast in the foaming step, causing large voids in the foams and irregular cell structure.

The volatiles content of the resinoid precursor can be reduced to the desired level by heating it at a temperature of from 150° to 250° F. for a period of five minutes to 24 hours. After this step the resinoid is pulverized again to particles not exceeding 40 mesh in size.

The resulting resinoid powder has a long shelf life; it is free-flowing even after being stored for several months.

This resinoid precursor can be foamed by the free rise (or unrestricted) method or in a mold. If the resin is foamed in a mold, pressures of from 1 to 5 psi developed by the gases released during the foaming process can be utilized to compress the foam and increase its density. In addition, external pressure can be applied to obtain a still higher density, if desired. In most cases the total pressure applied to the mold should not exceed 50 psi.

The resinoids are foamed by the application of heat and preferably at relatively low temperatures of 220° to 325° F. This produces the most homogeneous distribution of and the smallest cells.

The foam can be heated to a temperature in the range of 550°–600° F. to complete the cure of the polymer, if desired.

No solvents or catalysts or other reactants are used in the foaming step, which makes our novel process decidedly superior to heretofore proposed processes for making polyimide foams such as those described in U.S. Pat. Nos. 3,249,561 issued May 3, 1966, to Hendrix; 3,282,897 issued Nov. 1, 1966, to Angelo; 3,575,936 issued Apr. 20, 1971, to Dinan; 3,310,506 issued Mar. 21, 1967, to Ambroski et al; 3,520,837 issued July 21, 1970, to Wilson; and 3,542,703 issued Nov. 24, 1970, to DeBrunner.

From the foregoing it will be apparent to the reader that one primary and important object of our invention resides in the provision of novel, improved polyimide foams which remain flexible, resilient, and structurally stable over a wider range of service temperatures than has heretofore been the case.

Another primary object of our invention is the provision of novel, improved polyimide foams which remain flexible, resilient, and structurally stable at cryogenic temperatures.

A further primary object of our invention resides in the provision of novel, improved polyimide foams in accord with the preceding objects which will give off essentially no smoke when heated to degradation temperature.

Other primary objects of the invention reside in the provision of novel precursors for polyimide foams having the advantages identified in the preceding paragraphs and in the provision of novel methods for preparing the precursors and for converting them to foams.

Further, related, and also primary objects of the invention reside in the provision of precursors which have a long storage life and in the provision of methods for converting the precursors to foams which do not require high temperatures or pressures, solvents, catalysts or other undesirable steps or chemicals and which are capable of producing foams with small and homogeneously distributed cells.

Other objects and advantages and additional novel features of our invention will be apparent to those skilled in the relevant arts from the foregoing general description of the invention, from the appended claims, and from the following examples, which are intended only to illustrate and not restrict the scope of the invention.

EXAMPLE I

A precursor of the character we contemplate was prepared generally following the method disclosed in U.S. Pat. No. 3,506,583 issued Apr. 4, 1970, to Boran et al.

Specifically, 3,3',4,4'-benzophenonetetracarboxylic acid dianhydride (322.2 g, 1.0 M) was dissolved in 1,000 mls of reagent grade ethanol and refluxed with stirring for 60 minutes to convert it to the diethyl ester. The mixture was cooled to 131° F., and 54.6 g (0.5 M) of 2,6-diamino pyridine and 124.15 g (0.5 M) of 4,4'-diamino diphenyl sulfone were added.

The mixture was refluxed at 174.2° F. until complete solution occurred. Excess ethanol was removed under reduced pressure at a maximum temperature of 140° F. until the mixture became a thick syrup.

A surfactant (11.9 g of Union Carbide L-5430) was added and excess solvent removed by heating the mixture in a vacuum oven for 8 hours at 140° F. This resulted in a brittle residue which was pulverized, producing a free-flowing resinoid powder with a 40 mesh maximum particle size.

The powdered resinoid was placed in a flat, shallow dish and heated in an air circulating oven at 200° F. for a period of 6 hours to reduce its volatiles content. Thereafter, the resinoid was again pulverized into a powder with a maximum particle size of 40 mesh.

The melting point of this resinoid was 200°–225° F.; and its volatiles content fell within the range of 1 to 5 percent below the theoretical value, indicating incipient polymerization; i.e., that the resinoid contained a small amount of polymerized material in addition to unreacted ester and diamines.

The resin was free-flowing and remained so after having been stored for several months.

The time and temperature employed in the step of heating the resinoid to reduce its theoretical volatiles content are not critical and can be varied, if desired. For example, the resinoid can be heated at the temperature employed in Example I for 3 to 6 hours; at a temperature of 250° F. for 15 to 60 minutes; or at a temperature of 150°-160° F. for 16 to 24 hours.

EXAMPLE II

This example illustrates how the resinoids we have invented can be foamed by the free-rise or unrestricted method.

A few grams of a resinoid prepared as described in Example I was placed on a sheet of aluminum foil and transferred to an air-circulating oven heated to 250° F. The temperature was maintained at 250° F. until the resin melted (15 minutes).

The temperature in the oven was then raised to 320° F. at a rate of 1° to 2° F. every 10 minutes. Thereafter, the temperature was raised to 550° F. over a period of 30 minutes. The material was kept at this temperature for 60 minutes to complete the cure of the resin.

The product was a three-inch diameter bun of light yellow, resilient foam with a homogeneous cell structure and a density of two pounds per cubic foot.

Again, there is nothing critical in the particular operating parameters described in the example. An intermediate oven temperature as low as 220° and as high as 325° F. can be employed, and this range can be extended if maximum homogenity and minimum cell size are not required. The temperature could have been raised more rapidly to the 550° F. level (for example, in 20 minutes). The curing of the resin may be completed in as few as 30 minutes at temperatures ranging up to 600° F. with the curing time ordinarily being decreased as the curing temperature is increased.

EXAMPLE III

This example describes a test conducted to show that the novel polyimide foams we have invented remain stable and resilient at cryogenic temperatures.

A copolyimide artifact obtained by foaming the Example I precursor by the Example II process was immersed in liquid argon (approximately −300° F.) for several minutes. The foam was removed from the liquid argon and immediately crushed with sharp blows. The foam remained resilient, and its cellular structure was not affected by the cryogenic temperature or by the destructive test to which the foam was subjected.

EXAMPLE IV

To show that related, heretofore proposed polyimide foams which are homopolymers (see, for example U.S. Pat. Nos. 3,483,144 issued Dec. 9, 1969, to Lavin et al and 3,575,981 issued Apr. 20, 1971, to Le Blanc et al) do not have the novel properties which ours possess, a precursor was made by the process described in Example I using 228.3 g (1.0 M) of 4,4'-diamino diphenyl sulfone as the only diamine component. The resinoid was foamed by the method described in Example II.

The product was a yellow, rigid, brittle foam with a thick continuous skin on the outside and a rather nonuniform cell structure. When the foam was subjected to the destructive test described in Example I, it crumbled into a powder.

EXAMPLE V

In another test of the character described in the preceding example, and designed to show that heretofore suggested copolymers are not more suitable for our purposes than the homopolymers, the procedure of Example I was repeated using 54.07 g (0.5 M) of metaphenylene diamine and 114.15 g (0.5 M) of 4,4'-diamino diphenyl sulfone as the diamine component. The resinoid was foamed by the method of Example II.

When this foam was subjected to the destructive test of Example III, it was completely destroyed.

EXAMPLE VI

To demonstrate that the diamine constituents of our novel polyimide foams can be varied within the limits discussed above, the procedure of Example I was repeated using 54.07 g (0.5 M) of meta-phenylene diamine and 54.6 g (0.5 M) of 2,6-diamino pyridine as the diamine component. The resinoid was foamed by the Example II method.

The product was a very resilient, low density foam which had a homogeneous cell structure and a light color. This foam was subjected to the destructive test of Example II. It remained resilient and maintained its original cell structure.

The results of the foregoing and several additional tests are summarized in Table 1 below. In each case the resinoid was prepared according to the process of Example I, foamed according to the procedure of Example II, and tested as described in Example III. The ratio of diamines was equimolar unless specified otherwise.

TABLE 1

| Example | Ester | Polyamines | −330° F. Destructive Test - Effect on Foam |
|---|---|---|---|
| I | diethyl ester of BTA | 2,6 DAP, pDADPS | Resilient; no damage |
| IV | diethyl ester of BTA | pDADPS | Reduced to a powder |
| V | diethyl ester of BTA | mPDA, pDADPS | Foam destroyed |
| VI | diethyl ester of BTA | [mpDA] *2,6DAP, mPDA* | [Foam destroyed] *Resilient; no damage* |
| VII | diethyl ester of BTA | [2,6 DAP,] mPDA | [Resilient; no damage] *Foam destroyed* |
| VIII | diethyl ester of BTA | mDADPS | Reduced to a powder |
| IX | diethyl ester of BTA | 2,6 DAP, mDADPS | Resilient; no damage |
| X | diethyl ester of BTA | 2,6 DAP (.25M) mPDA (.75M) | Resilient; no damage |
| XI | diethyl ester of BTA | 2,6 DAP (.1M) pDADPS (.15M) mPDA (.75M) | Resilient; no damage |
| XII | diethyl ester of BTA | 2,6 DAP | Carbonized powder residue after foaming step |
| XIII | diethyl ester of BTA | mPDA, [p]*mDADPS* | Reduced to a powder |
| XIV | diethyl ester of BTA | pPDA, pDADPS | Reduced to a powder |
| XV | diethyl ester of BTA | pPDA, mDADPS | Reduced to a powder |
| XVI | diethyl ester of BTA | 2,6 DAP, pDADPSu | Resilient; no damage |

TABLE 1-continued

| Example | Ester | Polyamines | −330° F. Destructive Test - Effect on Foam |
|---|---|---|---|
| XVII | diethyl ester of BTA | 2,6 DAP (.3M), mPDA (0.2M), pDADPSu (0.5M) | Resilient; no damage |

Legend:
BTA = 3.3'.4.4'-benzophenonetetracarboxylic acid
pPDA = para-phenylene diamine
mPDA = meta-phenylene diamine
2,6DAP = 2,6-diamino pyridine
mDADPS = 3.3'-diamino diphenyl sulfone
DADPS = 4.4'-diamino diphenyl sulfore
pDADPSu = 4.4'-diamino diphenyl sulfide Examples I, [VII] *VI,* IX, X, *XI,* XVI, and XVII show that mixtures of aromatic diamines and heterocyclic diamines such as 2,6-diamino pyridine make copolyimide foams capable of withstanding severe mechanical stress at −300° F. without damage. Copolymide foams made from such diamines are also thermostable and unaffected by prolonged heating at temperatures as high as 600° F.

The homopolyimide foams (Examples IV, [VI, and VII] *VII, and VIII*) were completely collapsed or destroyed by subjecting them to mechanical stress at this temperature.

The copolyimide foams which did not possess a heterocyclic moiety in the polymer chain (Examples V, XIII, XIV, and XV) fared no better. This shows that it is not enough merely to employ a mixture of diamines indiscriminately selected from those of aromatic and heterocyclic character or entirely aromatic in character as taught by the above-cited Acle patents if a foam usable under stress at cryogenic temperatures is the goal.

Example XII shows that a mixture of diamines is essential even if a heterocyclic diamine is employed. The attempt to convert a precursor containing only one diamine to a polyimide produced a carbonized residue, not a foam, even though a heterocyclic diamine was employed.

Examples XI and XVII show that more than two diamines can be employed. Ordinarily, however, any advantages gained by using more than two diamines will not be significant.

The differences in the properties possessed by the various polyimides are possibly attributable to the secondary processes which take place during the imidization reactions. These secondary processes produce structures having intermolecular bondings or cross links, and these may be responsible for an increase in elasticity.

That structures of this character may be created is believed to be due to the low basicity constant of 2,6'-diamino pyridine and other heterocyclics with nitrogen in the ring, this resulting from the electron-attracting property of the nitrogen atom.

It can logically be assumed that the imide ring formed with a low basicity diamine such as a diamino pyridine is in a state of continuous cleavage and reformation at polymerization temperatures. This results in the formation of intermolecular imide links in addition to the expected intramolecular imide rings. The products can be represented by the following structural formula:

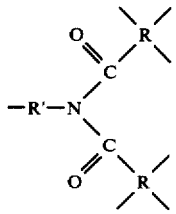

where R' and R represent the heterocyclic and tetra acid moieties, respectively.

It is, again logically, assumed that the equilibrium between the intermolecular and intramolecular structures is determined by the concentration of heterocyclic diamine in the original composition. Intermolecular condensation would be expected to prevail at high concentrations of heterocyclic diamine and could be practically quantitative when only a heterocyclic diamine is present in the resinoid. In this case the final product would be a highly crosslinked polymer having no characteristic polyimide properties. This is confirmed by the test of Example XII where, as discussed above, the foaming step produced a carbonized residue rather than a polyimide foam.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A process of making a copolyimide foam which comprises the steps of: dissolving two or more diamines in a mixture of an esterifying agent and one or more esters of a tetracarboxylic acid in an amount such that the imide forming functionalities are substantially equimolar, one of said diamines being heterocyclic and having nitrogen in the ring, another of said diamines being a para- or meta-substituted aromatic diamine which is free of aliphatic moieties, and any additional diamine being either a heterocyclic or an aromatic diamine as aforesaid; adding from 0.1 to 10 parts by weight of a surfactant based on the weight of the ester and diamine constituents; heating the resulting material at a temperature in the range of 150°-250° F. until the volatiles content of the material is from one to five percent lower than the theoretical volatiles content of the ester and diamine constituents; and thereafter heating the unfoamed precursor material existing at the end of said step of reducing the volatiles content to a temperature in the range of 220°-325° F. to develop a polymeric foam and then to a temperature of 550°-600° F. to cure the foam.

2. A copolyimide foam obtained by the process of claim 1.

3. A process as defined in claim 1 in which, following the addition of the surfactant, the product is heated under reduced pressure to remove excess esterifying agent and is then comminuted.

4. A process as defined in claim 1 in which the comminuted material is heated at a temperature in the range of 150°-250° F. until the volatiles content of the material is from one to five percent lower than the theoretical volatiles content of the ester and diamine constituents.

5. A process as defined in claim 1 in which the material is comminuted after heating it to reduce the volatiles content and in which it is comminuted material as aforesaid that is heated to develop a cellular physical structure and a copolyimide chemical structure.

6. A process as defined in claim 5 in which the comminuted material is heated as aforesaid in a mold and while applying a pressure of not more than 50 psi as the foam is developed to increase the density of the foam.

7. A process as defined in claim 1 in which any tetracarboxylic acid ester present in the precursor is a $C_1$-$C_3$ ester of 3,3',4,4'-benzophenonetetracarboxylic acid; the diamines are selected from the group consisting of 3,3'-diamino diphenyl sulfone, 4,4,'-diamino diphenyl sulfone, 4,4'-diamino diphenyl sulfide, 3,3'-diamino diphenyl ether, 4,4'-diamino diphenyl ether, benzidene, meta-phenylene diamine, para-phenylene diamine, 2,6-diamino pyridine, and 3,5-diamino pyridine; and heterocyclic and aromatic diamines are present in a ratio of from 5-95 parts by weight of heterocyclic diamine or diamines to 95-5 parts of aromatic diamine or diamines.

* * * * *